US007068709B2

(12) United States Patent
Hasegawa

(10) Patent No.: US 7,068,709 B2
(45) Date of Patent: Jun. 27, 2006

(54) CODE SYNCHRONOUS TIMING DETERMINING METHOD UPON INFORMATION RECEPTION IN CDMA SYSTEM, DETERMINING APPARATUS, AND CDMA RECEIVING APPARATUS

(75) Inventor: Jun Hasegawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 442 days.

(21) Appl. No.: 09/990,324

(22) Filed: Nov. 23, 2001

(65) Prior Publication Data

US 2002/0064213 A1 May 30, 2002

(30) Foreign Application Priority Data

Nov. 24, 2000 (JP) ............................ 2000-357157

(51) Int. Cl.
    H04B 1/69    (2006.01)
    H04B 1/216   (2006.01)
(52) U.S. Cl. ................... 375/150; 375/130; 370/342
(58) Field of Classification Search ............ 375/150, 375/130, 147, 149, 152, 343, 142, 316; 370/335, 370/342; 455/132, 133
    See application file for complete search history.

(56) References Cited

U.S. PATENT DOCUMENTS

| 5,644,591 | A |   | 7/1997  | Sutton |         |
|-----------|---|---|---------|--------|---------|
| 5,974,038 | A | * | 10/1999 | Shou et al. | 370/335 |
| 6,188,679 | B1| * | 2/2001  | Sato   | 370/335 |
| 6,252,899 | B1| * | 6/2001  | Zhou et al. | 375/140 |

FOREIGN PATENT DOCUMENTS

| EP | 0 820 156  | 1/1998  |
|----|------------|---------|
| EP | 0 848 503  | 6/1998  |
| EP | 0 932 283  | 7/1999  |
| GB | 2 286 509  | 8/1995  |
| JP | 11-340851  | 12/1999 |
| JP | 2001-188056| 7/2001  |

OTHER PUBLICATIONS

V. Tuukkanen, et al., IEEE 6th International Conference on Universal Personal Communications Record, pp. 698-702, XP-010248798, "Combined Interpolation and Maximum Likelihood Symbol Timing Recovery in Digital Receivers", Oct. 12, 1997.

* cited by examiner

Primary Examiner—Khai Tran
(74) Attorney, Agent, or Firm—Oblon, Spivak, McClelland, Maier & Neustadt, P.C.

(57) ABSTRACT

A code synchronous timing determining method comprising acquiring correlation values of a code at plural timings in each of a plural given time widths included in a given period, storing the correlation values corresponding to the plural timings, retrieving the maximal correlation value from the stored correlation values to register a retrieved timing corresponding to the maximal correlation value as the maximal timing, scanning the stored correlation values in a given direction to detect at least one minimal correlation value to register a retrieved timing corresponding to the detected minimal correlation value, extracting at least one correlation value selected from the correlation values stored at plural timings having a specified time interval from the maximal timing to the minimal timing as a high correlation value candidate, and holding timing data corresponding to the high correlation value candidate as timing information of code synchronism.

32 Claims, 8 Drawing Sheets

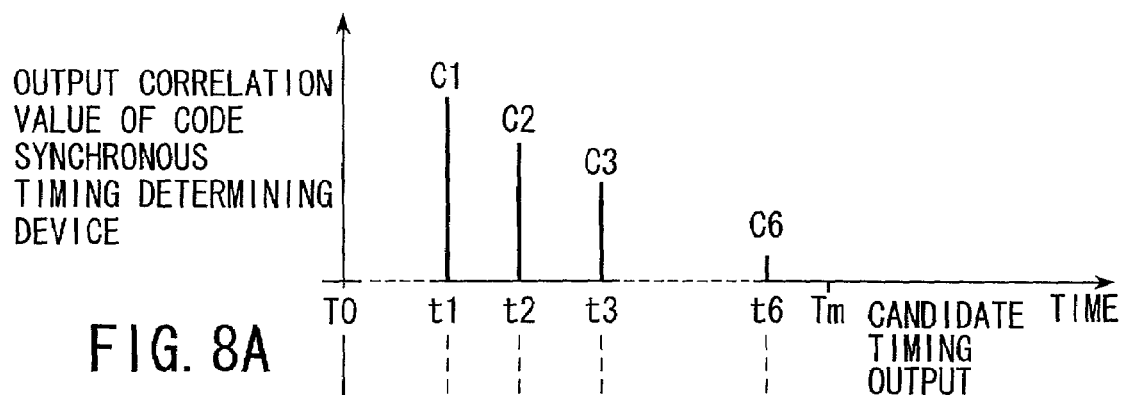
FIG. 8A
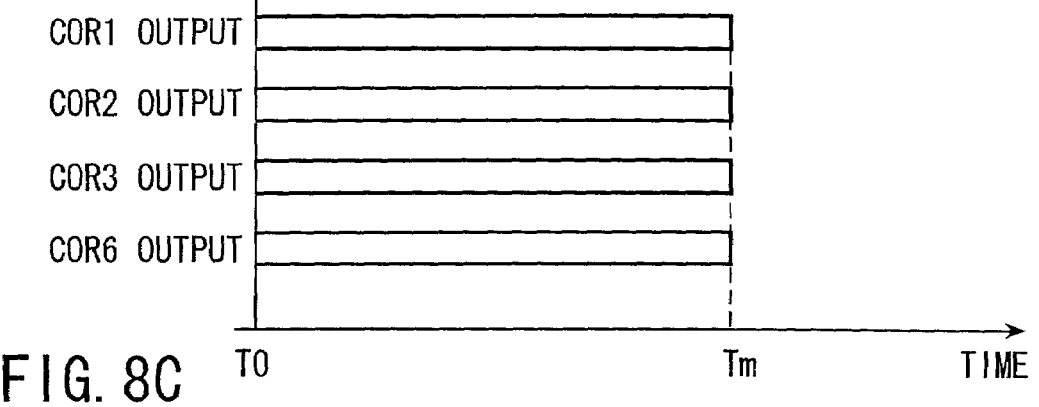
FIG. 8B
FIG. 8C

CODE SYNCHRONOUS TIMING DETERMINING METHOD UPON INFORMATION RECEPTION IN CDMA SYSTEM, DETERMINING APPARATUS, AND CDMA RECEIVING APPARATUS

CROSS-REFERENCE TO RELATED APPLICATIONS

This application is based upon and claims the benefit of priority from the prior Japanese Patent Application No. 2000-357157, filed on Nov. 24, 2000, the entire contents of which are incorporated herein by reference.

BACKGROUND OF THE INVENTION

1. Field of the Invention

The present invention relates to a code synchronous timing determining method upon information reception in a CDMA (code division multiple access) system, a determining apparatus thereof, and a CDMA information signal receiving apparatus.

2. Description of the Related Art

In the CDMA system, a transmission information signal of a specific channel can be received at a receiving station by de-spreading the transmitted spectrum spread signal using the same code data as code data used at a transmitting station in which the transmission information signal is spectrum spread by the code data. At the time of reception, the code synchronization must be established between the code data included in the transmission information signal and the code data prepared in the receiving station.

When an information signal is transmitted via the CDMA system, the length of a CDMA wave transmission path from the transmitting station to the receiving station is varied due to the change of the wave propagation direction by tall buildings and the like. The propagation direction of the CDMA wave is changed by a plurality of buildings many times so that the CDMA wave is propagated through a plurality of different propagation paths or multiple paths.

As a result, the same CDMA information signal is received at the receiving station at plural different timings depending on the difference in the path length. Also depending on the difference in wave propagation speed due to difference in temperature or density of air which is a propagation medium of the CDMA wave, plural CDMA waves of the same content are received at the receiving station at plural slightly different timings.

At the CDMA wave receiving station, as mentioned above, the correlation of the both code data is calculated by using the same code data as the code data used in spectrum spreading at the transmitting station to detect the timing at which a high correlation is detected, whereby the code synchronization is established and the CDMA reception signal in the assigned channel is de-spread and demodulated to regenerate an information signal transmitted from the transmitting station.

When the CDMA wave transmitted from the transmitting station is propagated through the multiple paths, plural code synchronization timings each having a high code correlation to a transmitted information signal in the assigned channel should be established.

In the CDMA wave receiving station, a combining device for accumulating a plurality of information signals propagated through multiple paths is used. In the combining device, the information signals incoming from other paths than the shortest path giving the largest correlation are combined in addition to the information signal obtained from the shortest path to enhance the reception precision. Such reception method is known as RAKE reception method in the CDMA communication field. In this RAKE reception method, the information signals propagated through multiple paths are utilized, and in order to enhance the information processing efficiency, the number of path information signals to be selected must be limited to a specified number including that giving the largest correlation. That is, the paths to be used should be limited to a finite number.

When receiving CDMA information signal, a code correlation value is calculated at plural sampling timings in a period corresponding to one itinerary time of code series used in spectrum spreading, and these code correlation values are stored, for example, in a RAM by using the address corresponding to each sampling timing. To utilize the received information signals incoming from a specified number of multiple paths in the RAKE combining device, it is required to obtain data of high correlation value timings of the number corresponding to the specified number of multiple paths.

In order to obtain a high correlation value timing, all sample timings in one itinerary time of code series are scanned, that is, from the beginning address to the final address in the RAM, and the largest correlation value of the read correlation values is determined. By extracting the timing corresponding to the address of the RAM conforming to this largest correlation value, it is determined as first candidate timing data for code synchronism of the received wave signal propagated through one of the multiple paths.

In the conventional timing determining method, when obtaining second candidate timing data for a path other than the one path giving the first candidate timing data, too, while masking data corresponding to the first candidate timing data determined in the first place, all sampled correlation values in one code series time are scanned in the RAM, that is, from the beginning address to the final address in the RAM, and the timing of the address corresponding to the next largest correlation value of the already determined the most largest correlation value is extracted, and obtained as the second timing data.

Similarly, thereafter, in all timing data for the specified number of multiple paths, all sampled correlation values in one code series time are scanned, that is, from the beginning address to the final address in the RAM, and the timing corresponding to the subsequent number of large correlation values of the remaining correlation values stored in the RAM is extracted sequentially, and obtained as the respective timing data. It hence takes a long time to establish the code synchronism of reception signals in each finger circuit of the RAKE combination device.

Incidentally, one path giving the timing to show a largest correlation value may have a plurality of timings giving large correlation values at close timings slightly deviated from this given timing. In such a case, even if one or more large correlation values are obtained, such vicinal timings should be excluded as candidates for specified timing data.

At the time of such data exclusion, however, a true candidate which should not be excluded for specified timing data may be excluded by mistake. Thus, to avoid such incident, a redundant storage device for temporarily storing all the corresponding data is needed.

Moreover, when deleting undesired timing information for exclusion, it is required to monitor the change state of the stored correlation value by time, and much complicated deletion control is necessary.

Recently, to enhance the reception performance of CDMA signal, there is a tendency of narrowing the sampling interval when extracting code correlation values. Therefore, when the spectrum spread rate of transmitted information signal is large, there are too many candidate timings to be scanned. In such a case, the number of timings of large correlation values to be detected is plenty, and it takes a longer time until the code synchronism is established for each of the multiple paths.

SUMMARY OF THE INVENTION

A code synchronous timing determining method according to an aspect of the present invention comprises: acquiring correlation values of a code included in a CDMA reception signal and an internal code prepared in a receiving station at plural timings in each of a plural given time widths included in a given period; storing the correlation values corresponding to the plural timings; retrieving a maximal correlation value from the stored correlation values to register a retrieved timing corresponding to the maximal correlation value as a maximal timing; scanning the stored correlation values in a given direction to detect at least one minimal correlation value to register a retrieved timing corresponding to the detected minimal correlation value; extracting at least one correlation value selected from the correlation values stored at plural timings having a specified time interval from the maximal timing to the minimal timing as a high correlation value candidate; and holding timing data corresponding to the high correlation value candidate as timing information of code synchronism.

BRIEF DESCRIPTION OF SEVERAL VIEWS OF THE DRAWING

FIG. 8A to FIG. 8C are diagrams explaining the operation of the CDMA receiving apparatus according to the embodiment of the present invention shown in FIG. 1, respectively.

DETAILED DESCRIPTION OF THE INVENTION

Figure 1:
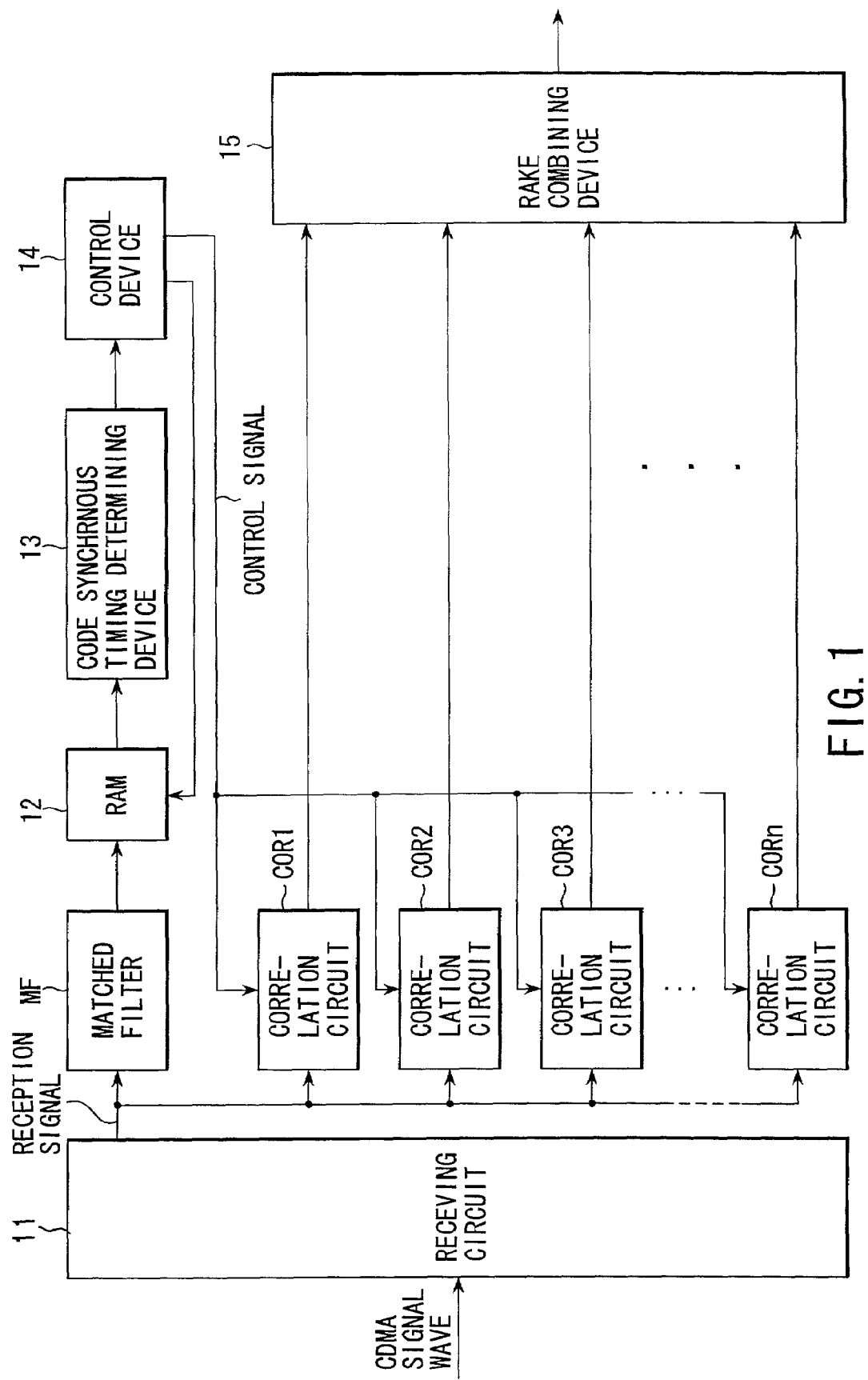
FIG. 1 is a block diagram showing a partial constitution of a CDMA receiving apparatus according to an embodiment of the present invention.

Referring now to the drawings, a first embodiment of the invention will be described in detail below.

The configuration and operation of a CDMA receiving apparatus according to the first embodiment of the invention will be explained with reference to FIG. 1.

In FIG. 1, the CDMA receiving apparatus comprises a receiving circuit 11, a matched filter MF used as a correlator, correlation circuits COR1 to CORn, a RAM 12, a code synchronous timing determining device 13, a control device 14, and a RAKE combining device 15. Matched filters may be used as the correlation circuits COR1 to CORn and the code synchronous timing determining device 13 and the control device 14 may be commonly configured by a digital signal processor. Further, the RAKE combining device 15 may include RAM devices for temporarily storing outputs of the respective correlation circuits COR1 to CORn so that the CDMA received signals of the multiple paths are combined together in synchronous manner.

The receiving circuit 11 is composed of, although not shown in the drawing, an analog circuit unit comprising an antenna for receiving a propagated CDMA signal wave and an intermediate frequency circuit for converting a high frequency signal from the antenna into an intermediate frequency signal, and a CDMA signal processing unit which is a digital circuit unit.

The CDMA signal processing unit is composed of, for example, an A/D converting circuit for converting an intermediate frequency signal into a digital signal, and a orthogonal demodulation circuit for generating a reception signal by removing noise component contained in the obtained digital reception signal.

The generated reception signal is supplied into the matched filter MF, and is also supplied into the respective correlation circuits COR1 to CORn. The matched filter MF and the correlation circuits COR1 to CORn are configured to have a high correlation to a spectrum spread code, for example, a pseudo noise (PN) code corresponding to the reception channel assigned to the CDMA receiving apparatus of the first embodiment, and correlation value data denoting demodulation data of the CDMA received signal is generated individually.

When the CDMA signal is received through a single propagation path such as a straightly direct propagation path, only one correlation value is ideally generated from the matched filter MF during the itinerary of a PN code series. However, actually plural related correlation values are generated closely before and after a particular correlation value which corresponds to the straight and direct propagation path, when the receiving station is a moving portable telephone terminal, for example. These related correlation values are derived from reception waves incoming from the same propagation path. They should not be used for determining the code synchronous timing in the first embodiment, and should be excluded as candidates for determining the code synchronous timing. This subject is specifically described later by referring to FIG. 2B.

From a transmitting station to a receiving station, if a plurality of propagation paths including deflection paths due to tall buildings and the like are formed aside from the straight and direct propagation path, plural CDMA signal waves are received sequentially with mutual time differences corresponding to the difference of the propagation path length. Therefore, from the matched filter MF, groups of correlation values in the number corresponding to the propagation paths are obtained sequentially, including the particular code correlation value obtained corresponding to the reception wave from the shortest or straight and direct propagation path, within a time range corresponding to an itinerary PN code series.

Figure 2A:
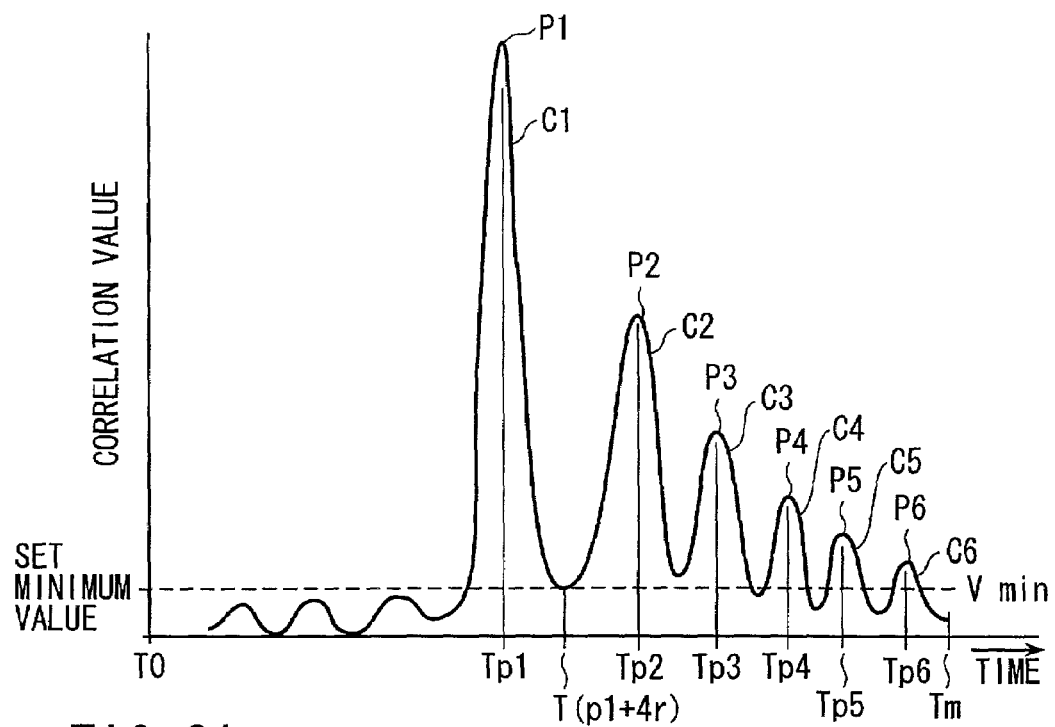
FIG. 2A is a diagram showing a correlation value curve plotted at plural timings of code correlation values of one channel signal in reception of a CDMA signal via multi paths.

FIG. 2A shows an example of a series of correlation value curve diagram thereof including plural groups of correlation values corresponding to multiple paths. In FIG. 2A, the abscissa shows timings and the ordinate shows correlation values. Assuming that the number of major propagation paths is 6, six groups of correlation values or six correlation curves C1 to C6 having timings Tp1 to Tp6 corresponding to six maximal values P1 to P6 are obtained in one itinerary time T0 to Tm of the PN code series.

In the following explanation, each of the six groups of correlation values is assumed to have a level larger than a set minimal value Vmin at the timings of Tp1 to Tp6. However, in a weak wave area, the level of the correlation values will be lowered under the minimal value Vmin. In this case, groups of correlation values for determining the code synchronization should be detected from such values smaller than the minimal value Vmin.

The correlation values obtained from the matched filter MF are stored in the RAM 12 one by one at each of the sampling timings. Herein, the RAM 12 has addresses corresponding to the plural sampling timings from time point T0 to time point Tm shown in FIG. 2A, and is controlled by an output of an address counter (not shown) included in the control device 14. Since CDMA reception signals are continuously supplied to the matched filter MF, the data of the correlation values giving the correlation value curve shown in FIG. 2A is obtained in every itinerary PN code series, and accumulated in the RAM 12.

When the CDMA receiving apparatus of the embodiment is a portable data processing terminal or a mobile telephone, the relative distance between the transmission station and the mobile telephone is regarded to be slightly changed even in a short time period, and each path length of the multiple paths is changed during this short time period, thereby appearing related correlation values before and after the particular timing corresponding to the shortest path.

Figure 2B:
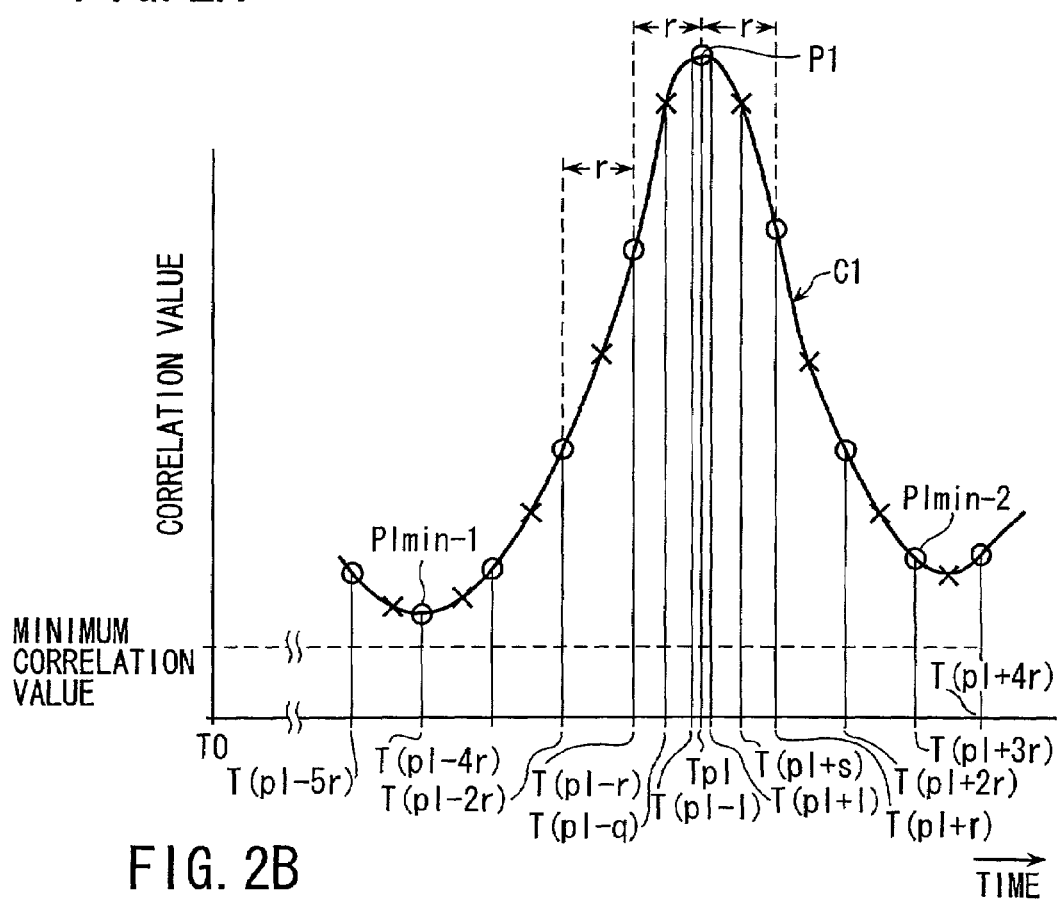
FIG. 2B is a correlation curve diagram explaining the operation of a code synchronous timing determining circuit shown in FIG. 1.

For example, as shown in FIG. 2B, the related correlation values which should be ignored in the code synchronous timing determination operation will be appeared within a predetermined time width "r" between timings T(p1−1) and Tp1 and the time width "r" between the timings Tp1 and T(p1+s), before and after the peak or maximal correlation value P1 corresponding to one of the multiple paths. This predetermined time width "r" may be determined experimentally or statistically.

The groups of correlation data giving curves C1 to C6 are accumulated repeatedly in the same addresses of the RAM 12 to store large correlation values. On the other hand, noise components appearing irregularly are also accumulated continuously in the same addresses of the RAM 12, and are hence substantially neglected.

The correlation values stored in the RAM 12 is read out therefrom and is supplied to the code synchronous timing determining device 13 one by one according to the address designation corresponding to the sampling timings. In this code synchronous timing determining device 13, a plurality of high correlation value candidates are obtained from the supplied correlation values. A plurality of code synchronous timing candidates are extracted from the high correlation value candidates and the extracted data is supplied to a control device 14 so as to control the operations of the correlation circuits COR1 to CORn. The operations of these units 13 and 14 will be explained in detail in the first and second embodiments.

FIRST EMBODIMENT

Figure 3:
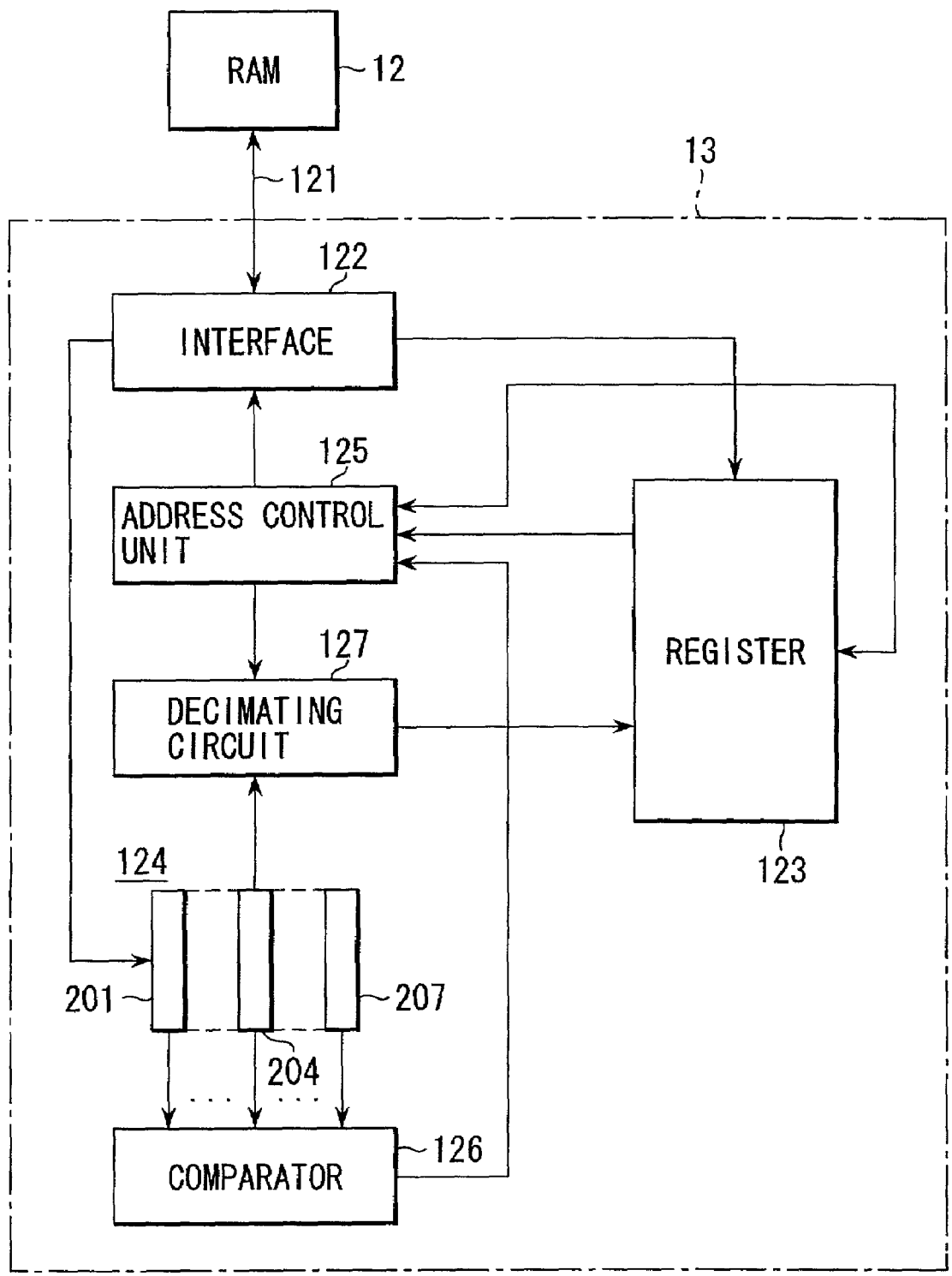
FIG. 3 is a block diagram of a constitution of a code synchronous timing determining apparatus according to the embodiment of the present invention shown in FIG. 1.

FIG. 3 shows an example of the configuration of the code synchronous timing determining device 13 according to the first embodiment. In this first embodiment, correlation value data stored in the RAM 12 is read out one by one from the starting address of the RAM 12 under the designation of the address data supplied from the code synchronous timing determining device 13.

The read data is supplied, one by one, to an interface 122 provided in the code synchronous timing determining device 13 through a bus 121.

The code synchronous timing determining device 13 further comprises an interface 122, a register 123, a FIFO type shift register 124, an address control unit 125, a comparator 126, and a decimating circuit 127.

The register 123 holds, for example, 16 high correlation value candidates each including a correlation value data and associated timing data, that is, the identifier and correlation value at the timing of high correlation candidate.

The interface 122 receives plural correlation value data read from the RAM 12, that is, the identifier and correlation value at plural sampling timings in the code time series, according to a control signal from the address control unit 125.

The FIFO type shift register 124 holds plural correlation value data sequentially read out from the RAM 12 through the interface 122, that is, the identifier and correlation value at plural timings in the time series, in the FIFO format according to the time forward direction. Though the structure of the code synchronous timing determining device 13 shown in FIG. 3 has a combination of discrete block units, it is possible to use a firmware for executing the functions provided in the circuitry shown in FIG. 3.

Figure 4:
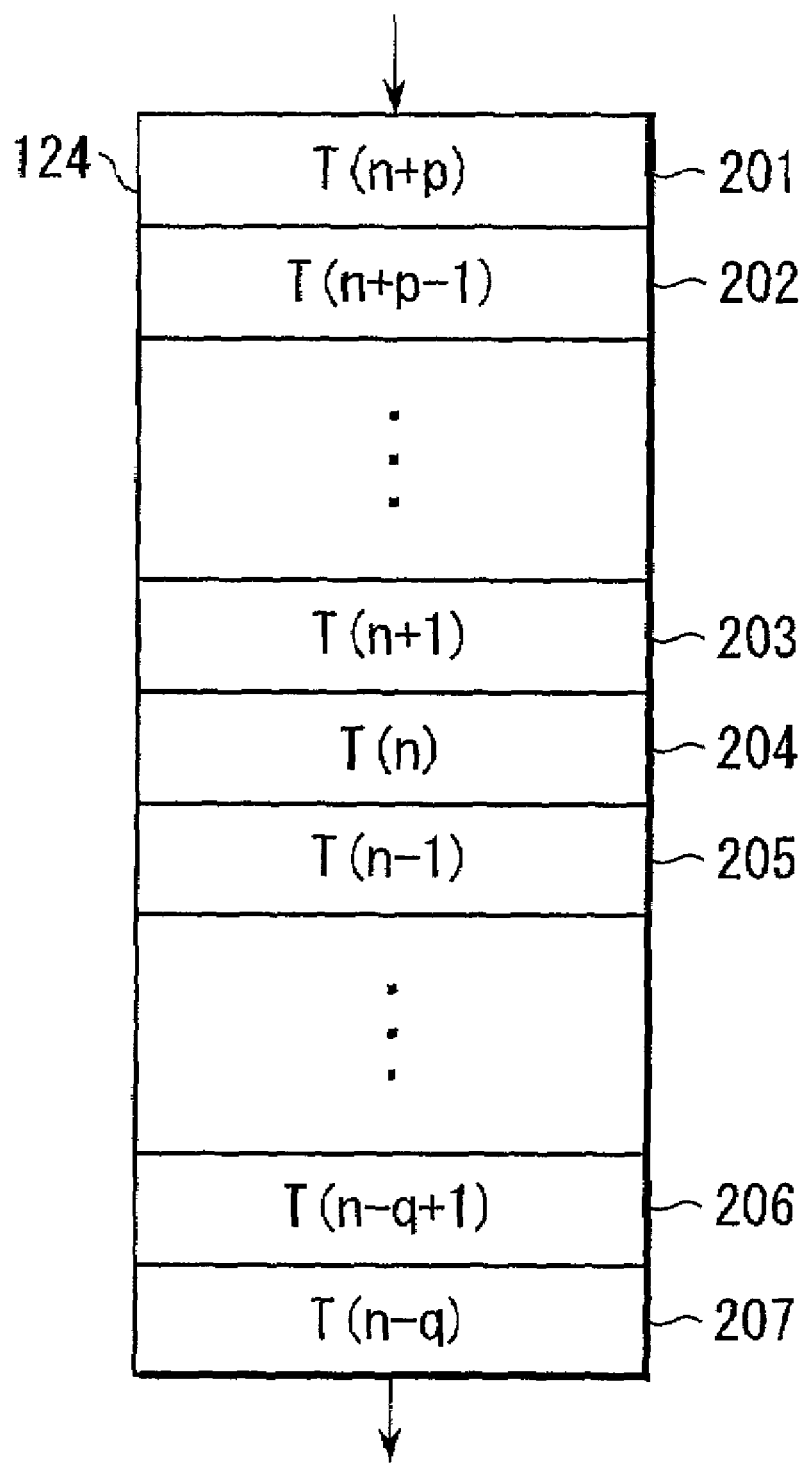
FIG. 4 is a diagram showing an example of an information holding pattern of a FIFO-type shift register shown in FIG. 3.

FIG. 4 shows a timing data holding pattern of the FIFO type shift register 124. Each shift stage of the FIFO type shift register 124 is composed of plural FIFO type shift register stages of multiple flip-flops, and the correlation value data denoting the code synchronous timing information being read out from the RAM 12 through the interface 122 (FIG. 3) is sequentially transferred from a beginning shift stage 201 to a final shift stage 207.

That is, the first correlation value data or first timing information entered in the shift register 124 is latched in the beginning shift stage 201. When next correlation value data (that is, second timing data) is entered in the shift register 124, the first correlation value data held in the beginning shift stage 201 is shifted to a second shift stage 202, and is latched in this shift stage 202. The second correlation value data is latched in the first shift stage 201.

Thus, the first correlation value data at last reaches the final shift stage 207. After the first correlation value data reaches the final shift stage 207, the data held in the timing of notice stage 204 is compared with each of data held in the remaining stages. When next correlation value data is entered in the beginning shift stage 201, the correlation value data being latched in all shift stages 201 to 207 will be shifted by one stage each. Therefore, the first correlation value data latched in the final shift stage 207 is discarded.

When the first correlation value data read out from the starting address of the RAM 12 is shifted to the timing of notice stage 204 of the FIFO register 124, all stages of the FIFO register 124 from the stage 201 to the stage 204 hold a series of correlation value data. With this condition, the comparator 126 compares the correlation value held in a timing of notice stage 204 with the correlation values held in the remaining stages 201 to 203 in the FIFO type shift register 124.

In this FIFO type shift register 124, the intermediate shift stage 204 is defined to hold a correlation value data of a timing of notice. Each time a correlation value data is supplied from the RAM 12 to the first shift stage of the FIFO shift register 124 according to an interval of the sampling time, the timing of notice data held in the stage 204 is compared with the remaining data in the remaining stages in the FIFO shift register 124 so as to detect the maximal or minimal timing data.

When the correlation value held in the timing of notice stage 204 is detected as being the smallest correlation value of the whole correlation value data held in the FIFO register 124 which corresponds to the specified time region as will be explained later in FIG. 4, the smallest correlation value data held in the timing of notice stage 204 is determined as the first minimal timing data. Then, the correlation value held in the stage 204 is issued to the address control unit 125.

When the minimal timing data is determined, a maximal timing data is determined in the similar manner as in the minimal timing data determination using the FIFO register 124.

Assuming that the determined minimal timing data has a correlation value P1min−1 and the minimal timing is T(p1−4r) and, the determined maximal timing data has a correlation value P1 which is associated with the maximal timing Tp1, as shown in FIG. 2B. Therefore, when the maximal timing Tp1 is determined, the timing of notice stage 204 hold the correlation value corresponding to this maximal timing Tp1.

After the minimal and maximal timing data is determined as described above, the data shift operation in the FIFO register 124 is temporarily stopped and the correlation data stored in the RAM 12 is read from the addresses corresponding to the determined minimal and maximal timing data T(p1−4r) and Tp1.

In this state, high correlation value candidates are compared with selected correlation values taken out between the determined minimal and maximal timing data T(p1−4r) and Tp1 shown in FIG. 2B.

First, the correlation value P1 read out from the RAM 12 at the address corresponding to the maximal timing Tp1 is compared with the smallest correlation value of the 16 high correlation candidates held in the register 123.

Then, a correlation value data read from the RAM 12 at an address corresponding to the timing T(p1−r) as shown in FIG. 2B is selected and compared with the smallest correlation value of the 16 high correlation candidates held in the register 123. The correlation value data included in the related correlation values or shoulder values defined by the dead time width "r" in the backward direction from the maximal value P1 is ignored in the candidate determination process. In the circuitry shown in FIG. 3, the dead time width "r" is defined by the decimating circuit 127. This decimating circuit 127 may be configured with an adder circuit for calculating addresses of the RAM 12 for reading the correlation values at every "r" address intervals T(p1−r), T(p1−2r), T(p1−3r) on the RAM 12, as shown in FIG. 2B.

Every time the correlation value is read out from the RAM 12 at every "r" address intervals, the read correlation value is compared with the smallest correlation value of the 16 high correlation candidates held in the register 123. Only when the read correlation value is larger than that held in the register 123, the correlation value in the register 123 is replaced with the read correlation value.

Namely, when the correlation value read from the RAM 12 is larger than the smallest correlation candidate value of the 16 candidate values held in the register 123, a replacement signal for replacing the smallest correlation candidate value with the read correlation value is issued to the address control unit 125.

After the candidate registering operation of the correlation values between the maximal and minimal timings other than the dead time width "r" is performed for the first pair of minimal and maximal timings, the code synchronous timing determining device 13 incorporates the correlation value data sequentially read out from the RAM 12 into the temporarily stopped FIFO register 124, so as to determine the second minimal timing T(p1+3r).

The correlation value data is read out of the RAM 12 and is supplied, one by one, to the FIFO type shift register 124, and every time the correlation data held in the timing of notice stage 204 is renewed by the newly shifted correlation value data, the data held in the timing of notice stage 204 is compared with the correlation values held in the remaining stages in the FIFO register 124, in the similar manner as in the case of determining the first minimal timing P1min−1.

When the second minimal timing T(p1+3r) as shown in FIG. 2B is detected, the FIFO register 124 holds the correlation values data in this state. This time, the correlation value data between the maximal and minimal timings Tp1 and T(p1+3r) are read out from the RAM 12, in the similar manner as in the case of the first pair of maximal and minimal timings, while ignoring the correlation value data included in the dead time width "r".

Each of the correlation values read at every "r" intervals are compared with the smallest correlation value of the 16 high correlation value candidates held in the register 123. When the incorporated correlation value is higher than the registered value, this correlation value is replaced with those registered in the register 123, and the corresponding timing data is also saved. The newly incorporated correlation value is compared with 15 already held correlation values, and the values are shuffled in the order of the data level.

When the candidate registering process with respect to the correlation values extracted from the maximal and minimal timings Tp1 and T(p1+3r), the data shifting operation in the FIFO register 124 is again started. Each time the data shifting is performed in the stages of the FIFO register 124, the correlation value data held in the timing of notice stage 204 is compared with the correlation value data held in the remaining stages in the FIFO register 124. When a second maximal timing is detected in the correlation value data after the determined second minimal timing T(p1+3r), the high correlation value registering operation is performed and the top 16 candidates stored in the register 123 are renewed.

Thus, every time a pair of maximal and minimal timings is detected with respect to the correlation values held in the FIFO register 124 and read out from the RAM 12, 16 correlation values from the highest correlation value are renewed in the code synchronous timing determining device 13.

The similar operation is continued until the correlation value data read from the last address of the RAM 12 is shifted to the timing of notice stage 204 of the FIFO register 124. In the case of the correlation value data stored in the RAM 12 and shown in FIG. 2A, all the correlation value data denoting curves C1 to C6 corresponding to first to sixth paths are shifted one by one in the FIFO register 124 from the starting address of T0 to the end address Tm.

Thus, according to the first embodiment, after the maximal and minimal correlation values are determined, the correlation value data ranging between the addresses corresponding to the determined maximal and minimal correlation values are sequentially read and supplied to the FIFO type shift register 124 one by one, so that the minimal correlation value of high correlation candidates held in the register 123 is replaced, only when a larger correlation value is detected in the correlation value data held in the FIFO type shift register 124, with the detected large correlation value. Therefore, by a small number of times of address scanning of the RAM 12, the information of the high correlation candidates or timings can be stored in the register 123.

In the above-mentioned first embodiment, all the correlation value data stored in the RAM 12 is read and transferred into the FIFO register 124 from its starting address T0 to the end address Tm, so as to register timing candidates with respect to each of the pairs of maximal and minimal timing data. However, when it is known that effective correlation data including all effective peak value data is included within a predetermined time width, it is not necessary to scan the whole addressed of the RAM 12. In this case, scanning of the correlation value may be limited only in this predetermined time width. This case is a modification of the first embodiment.

In this modification of the first embodiment, a largest correlation value data should be detected by scanning the whole values stored in the RAM 12. A method for detecting the largest correlation value from the data stored in the RAM 12 may be performed using a known largest value detection method. Therefore, this method is not explained in detail here.

When the largest correlation value is detected, a predetermined limited time width is set in the address area of the RAM 12. This limited time width may be determined in an experimental or statistic manner.

Assuming that a largest peak value P1 is first obtained as shown in FIG. 2A from the first scanning operation of the whole addresses of the RAM 12, for example. In this case, a first address which should be designated in the RAM 12 should be defined in the forward direction from the time Tp1 by a time width Titv equal to the time width from the peak P1 to the peak P6 (Tp6−Tp1=Titv). Namely, correlation value data from the first address thus defined is first read out from the RAM 12 and supplied to a FIFO type shift register 124 provided in the code synchronous timing determining device 13.

Once the limited time width is determined, corresponding correlation value data may be read out one by one from the corresponding addresses of the RAM 12 and the read data is transferred into the FIFO register 124 in the similar manner as in the first embodiment, so as to detect the minimal and maximal timings.

In this modification case, the total number of data which should be transferred from the RAM 12 to the FIFO register 124 is less than that in the case of the first embodiment, so as to shorten the data processing period for determining the maximal and minimal timings when compared with the case of the first embodiment.

SECOND EMBODIMENT

In the above-mentioned first embodiment of the present invention, after the maximal and minimal timings are determined, large correlation values are detected from the correlation values included between the maximal and minimal timings and, small candidate registered in the register is replaced in the register 123 using the values held in the FIFO register 124.

In this case, the data held in the FIFO register 124 is maintained as it is, and the data of the RAM at the corresponding addresses may be utilized so as to effectively utilize the FIFO register 124.

However, in the second embodiment, a maximal timing data is first determined and a minimal timing data may be detected while large correlation values are detected and replaced using the correlation value data held in the FIFO register 124. The second embodiment can be realized using the circuit shown in FIGS. 3 and 4 while the minimal timings are determined as will be described here by referring to the flowcharts shown in FIGS. 5, 6 and 7.

In this second embodiment, a maximal timing is first detected in the similar manner as in the first embodiment utilizing the correlation value data read out from the RAM 12 and transferred into the FIFO register 124 one by one in the timing of the sampling rate.

Assuming now that a maximal correlation value P1 is first detected using the FIFO register 124. This maximal value detecting method can be performed by the similar method as in the first embodiment and the detailed description is omitted here. Then, for detecting a pair of minimal correlation timings before and after the detected maximal correlation timing Tp1, correlation value data are successively supplied to the FIFO register 124.

Every time new correlation value data is shifted into the FIFO register 124, there is a possibility that the minimal correlation timings are detected, and in the same time, high correlation value candidates are detected from the correlation values held in the FIFO register 124.

Plural correlation value data following a starting correlation value data determined in accordance with the first detected maximal timing Tp1, the following data is sequentially read out from the RAM 12 and supplied one by one to the above-mentioned FIFO type shift register 124, so as to detect a pair of minimal timing data in the forward and backward directions form the detected maximal correlation data P1.

When the correlation value of the timing of notice held in the shift stage 204 is smaller than any correlation value held in the remaining shift stages of the shift register 124, this correlation value data held in the timing of notice stage 204 is determined as a minimal timing data.

When the correlation value at the timing of notice stage 204 is larger than the minimal correlation candidate value of the high correlation candidates held in the register 123, the smallest correlation value of the high correlation candidates is replaced with the correlation value at the timing of notice from the decimating circuit 127.

In the second embodiment of the present invention, after the maximal timing is determined, the minimal timings may be determined, or large correlation values are detected and replaced in the register 123 using the values held in the FIFO register 124 between the determined maximal timing and the minimal timings. In this case, correlation value data stored in the RAM 12 may not be utilized unlike the case of the first embodiment and the correlation data transferred to and held in the FIFO shift register 124 should be utilized.

Now, the operation of the second embodiment using the code synchronous timing determining device 13 having the configuration as shown in FIG. 3 is explained below by referring to the correlation value curve diagram shown in FIG. 2B and flowcharts in FIG. 5 to FIG. 7. In the following explanation of the second embodiment, a maximal timing value P1 is first determined using the FIFO type shift register 124, and one of two minimal correlation value data, namely, the minimal data P1min-1 shown in FIG. 2B in the backward direction is determined using another FIFO type shift register, while obtaining large correlation values to be replaced with high correlation value candidates held in the register 123 using the circuitry shown in FIG. 3.

First, as in the case of the first embodiment, it is assumed that the correlation value data denoting the correlation value curves C1 to C6 shown in FIG. 2A are stored in the RAM 12 shown in FIG. 1. Then, a first maximal correlation value P1 is assumed to be determined by the data held in the FIFO register 124. A series of address data corresponding to the determined address range is supplied to the control device 14 from the RAM 12, and the correlation value data relating to the first correlation value curve C1 are sequentially read out.

A predetermined time width "r" corresponding to the above-mentioned related correlation values or shoulder values is set before and after the timing of notice Tp1 in the stages of the FIFO register 124, in the same manner as in the first embodiment. Herein, in FIG. 2B, the time width "r" is from T(p1−r) to Tp1 and from Tp1 to T (p1+r).

In FIG. 2A, when the timing corresponding to the detected maximal point P1 of correlation value curve C1 is held in timing of notice stage 204 of the FIFO shift register 124, the maximal point P1 is defined to be at the timing of notice.

The pieces of correlation value data included in the time width from the timing (Tp1−Titv) to the timing Tp1 are sequentially read out one by one at the interval of the sampling time and supplied to the FIFO shift register 124. For example, when the first read out data is shifted in the timing of notice stage 204, the data in the timing of notice stage 204 is compared with the data held in the remaining stages of the FIFO shift register 124 shown in FIGS. 3 and 4.

The correlation value data read out from the RAM 12 and held in the FIFO shift register 124 are defined as data including the correlation value and timing identifier associated therewith and must be handled by relating to each other as information. The timing identifier is the timing value itself, its coded value, or the count value by the address counter, and for example, the address data of the RAM 12 holding digitized correlation value is taken out from the address counter (not shown), and used.

Figure 5:
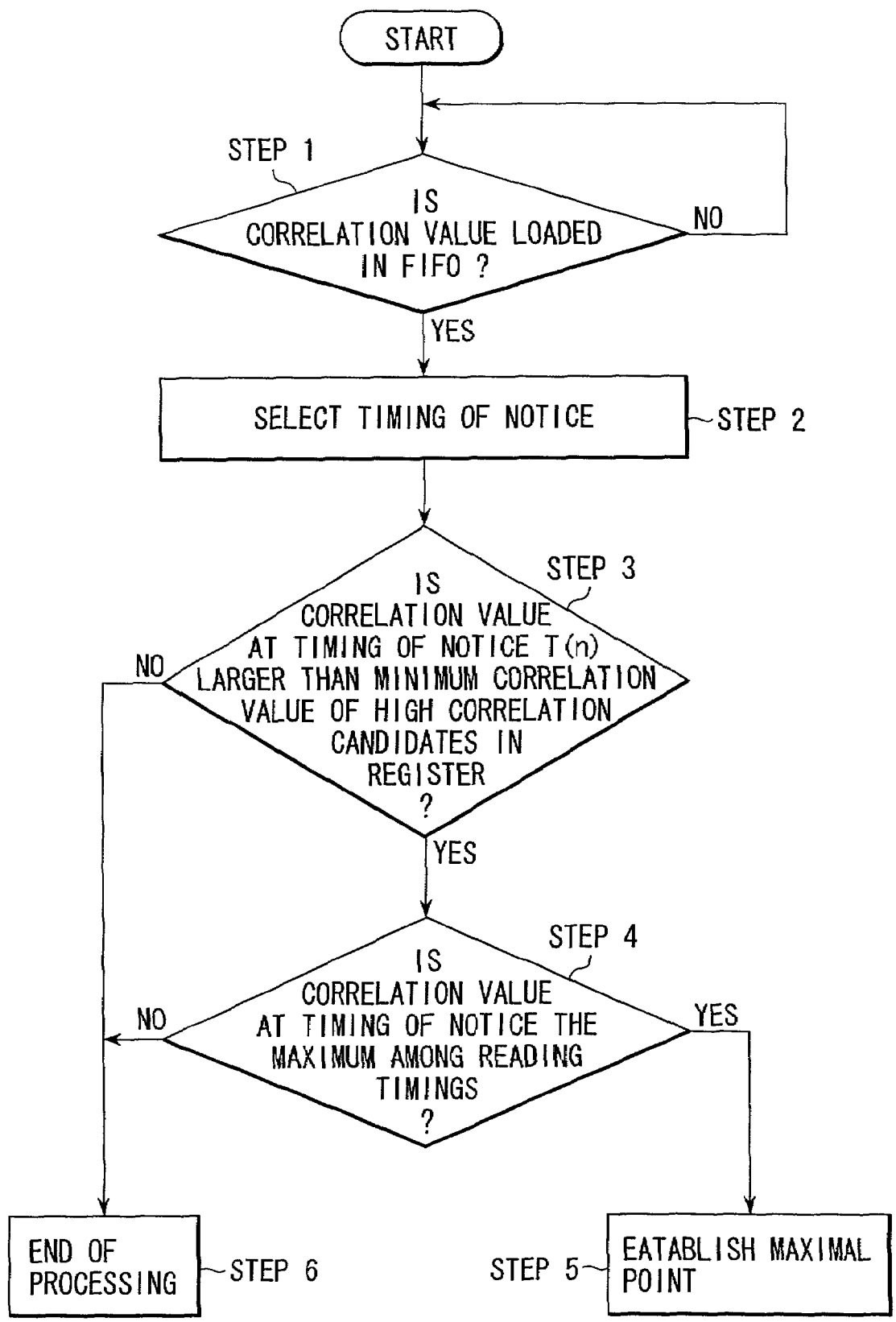
FIG. 5 is a flowchart showing the procedure of retrieving maximal timing of a correlation value in the code synchronous timing determining circuit shown in FIG. 3.

Now, the procedure of determining the maximal value timing using the detected largest correlation value P1 included in the code correlation value curve C1 is explained by referring to the flowchart in FIG. 5.

As shown in the flowchart in FIG. 5, at step 1, whether the correlation value data from the RAM 12 is loaded in the FIFO shift register 124 is checked. If YES in step 1, the correlation value data showing timing tp1, for example, is selected as a timing of notice T(n) from the stage 204 of the FIFO type shift register 124 holding a series of the correlation value data corresponding to the related correlation values or shoulder values, as shown in FIG. 2B, and the process is shifted to step 3. If NO in step 1, the process is continued until YES is obtained.

At step 3, the correlation value of the timing of notice T(n) is checked if larger than the smallest candidate value of the high correlation value candidates held in the register 123. When judged to be larger than the smallest candidate value in the register 123, the process goes to next step 4. If NO is obtained, the process goes to step 6 and terminated.

When the correlation value of timing of notice T(n) is smaller than the smallest value of the registered high correlation value candidates, the process goes to step 6 and is terminated.

At step 4, the given number of stages of the FIFO type shift register 124 define a predetermined time width before and after this timing of notice T(n) stage 204. For example, as shown in FIG. 2B, the time width is set from timing T(p1−q) before the timing of notice T(n) till timing T(p1+s) after T(n)=tp1.

The time width including these timings T(p1−q) and T(p1+s) must be set so as to come within the related correlation time width or a dead period "r" of correlation formed before and after the timing of notice T(n). In this dead period "r" of correlation, in the case of multiple-path reception of CDMA information, from the timing of notice T(n) until "r", it is known that a high correlation value of reception signals by way of other propagation path is not obtained statistically. That is, at the timing satisfying the relation of T(p1−q)=T(p1−r), T(p1+r)=T(p1+s) which are defined by the number of stages of the FIFO register 124, it is known that the correlation value by the pass different from the path for obtaining the correlation value corresponding to the timing of notice T(n) does not appear. Therefore, when the correlation value corresponding to the timing of notice T(n) is a predetermined level or more, it is known that the correlation values included in the time width "r" must be ignored even if the level of the read correlation value is high.

When the time width from the timing T(p1−q) before the timing of notice T(n)=tp1 till timing T(p1+s) after T(n) is set, the address data for specifying T(p1−q), that is, the earliest timing data in the time width is given to the RAM 12, and reads out the correlation value data. This data is transferred from the interface 122 to the beginning shift stage 201 of the FIFO type shift register 124.

By the address specifying data from the control device 14, consequently, the correlation value data of the timing data T(p1−q+1) is read out, and transferred to the beginning shift stage 201 of the FIFO type shift register 124, and the correlation value data at the timing T(p1−q) is shifted to the next stage 202.

Similarly, the first read correlation value data gradually shifted is finally shifted to the final shift stage 207 of the shift register 124 as shown in FIG. 4. When the correlation value data of the timing of notice T(n)=tp1 in FIG. 2B is held in middle shift stage 204, and the correlation value data at the timing T(p1−q) is held in the final shift stage 207, the correlation value data at timing T(p1+s) is held in the beginning shift stage 201. Therefore, the dead period "r" of correlation mentioned above is determined by the number of stages of this FIFO type shift register 124.

Consequently, the correlation value group stored at the address of the RAM 12 corresponding to the selected timing T(n) is read out from the RAM 12, and is supplied into the FIFO type shift register 124 from the interface 122, and as shown in FIG. 4, it is held in the shift stages 201 to 207 together with the associated correlation values.

At step 4, the correlation value at the timing of notice T(n) held in the shift stage 204 and each correlation value held in each shift stage of the shift register 124 are compared by the comparator 126 every time the following correlation value data is read out from the RAM 12 one by one.

As a result of comparison by the comparator 126 at step 4, the correlation value at the timing of notice T(n) is checked if larger than any correlation value in the remaining stages in the FIFO type shift register 124. If a largest correlation value is found in the process of the comparison, going to step 5, the largest correlation value is determined as the maximal value in the correlation value curve C1, and the corresponding timing is established as the code synchronous candidate timing.

For example, when the correlation value at timing T(n)=tp1 is held in the timing of notice stage 204 in the FIFO shift register 124, the correlation value at timing T(n)=tp1 is compared with the correlation value of the timing T(p1−1) before timing T(n)=tp1 in the related correlation timing width from the timing T(p1−q) till T(p1+s). In the similar way, it is compared with the correlation value at timing T(p1−2) (not shown). Similarly, hereinafter, the timing in the related time region "r" is sequentially compared up to the earliest timing T(p1−q) in the time region.

Likewise, the correlation value at a given timing T(n)=Tp1 is compared with the correlation value at timing T(p1+1) after timing T(n)=tp1 in the time region, and is then compared with the correlation value at a timing T(n+1) (not shown). Thereafter, while sequentially shifting the timing data in the related time width "r", the correlation value in the timing of notice stage 204 is compared with the remaining data up to the timing T(p1+s) in the time width.

In the first embodiment, the minimal value is determined using the FIFO shift register 124 in the similar manner as the maximal value determination shown in FIG. 5 so as to first determine the maximal and minimal timings. After that, the high correlation value candidates are detected between the time width corresponding to the maximal and minimal timings in this first embodiment.

For example, when the correlation value P1 at timing T(n) has determined as the maximal value by the process of FIG. 5, this timing T(n) is established as a candidate correlation value in the path curve C1, that is, the code synchronous candidate timing corresponding to the CDMA signal propagated through the first path.

When the correlation value at the timing of notice is larger than the smallest correlation value of 16 high correlation value candidates held in the register 123, the comparator 126 issues a replacement signal for replacing the smallest correlation value with the correlation value at the timing of notice to the address control unit 125.

The decimating circuit 127, only when the comparator 126 issues a replacement signal at every interval corresponding to the dead time width "r", allows the timing data held in the FIFO type shift register 124 to pass the register 123 through the decimating circuit 126 by a control signal from the address control unit 125. As a result, when the correlation value at the timing of notice is larger than the minimal correlation value of high correlation value candidates held in the register 123, the smallest correlation value of high correlation value candidates is replaced with the correlation value at the timing of the interval "r" under the control of the output signal from the decimating circuit 127.

On the other hand, according to the second embodiment, the smallest correlation value is determined while the correlation value data held in the FIFO shift register 124 is compared with the high correlation value candidates held in the register 123 to find out a candidate larger than those registered in the register 123. When the correlation value is higher than the smallest value registered in the register 123, the smallest value is replaced with the value held in the FIFO shift register 124. Therefore, according to the second embodiment, with a small number of times of address scanning of the RAM 12, the information of the high correlation timing can be stored in the register 123.

Incidentally, comparison between the correlation value at timing of notice T(n) and smallest correlation value in high correlation value candidates in the register 123 at step 2 shown in FIG. 5 is not always required. However, by executing the step 2 process, if the correlation value at timing of notice T(n) is smaller than the smallest correlation value of high correlation value candidates, by immediately going to step 5 and terminating the process relating to the timing T(n)=tp1 for the first path, subsequent wasteful processing about timing T(n) can be prevented, and the processing efficiency of the entire system is enhanced.

As a result of comparison at step 4, if correlation values of two or more consecutive timings, for example, Tp1, T(p1+1), T(p1+2), are same values, only the timing of notice T(n)=Tp1 is registered as the maximal timing point. Other timings T(p1+1) and T(p1+2) are judged to be timings of maximal correlation value, but are not registered as maximal timings. That is, once the maximal timing is registered, as explained below, the maximal timing is not registered again until a next minimal timing is registered.

At step 4, if the correlation value at timing of notice T(n)=tp1 is found to be larger than any correlation value in the FIFO type shift register 124, going to step 5, the process relating to the timing of notice T(n)=tp1 is terminated.

In FIG. 2B, when the timing of notice T(n)=tp1 is confirmed to have the maximal correlation value, before and after this timing T(n)=Tp1, the contents held in the FIFO type shift register 124 is held therein temporarily.

Then, a series of correlation value data are again read out from the address of the RAM 12 and held in the FIFO type shift register 124. In this condition, the dead or shoulder correlation value data is specified at the interval of time width "r" on the FIFO type shift register 124, and the minimal timing of the correlation value known to be present in relation to the timing of notice T(n)=Tp1 is detected. This time width "r" is, as mentioned above, determined on the basis of the statistic confirmation that a high correlation is obtained at a specific time interval before and after the timing T(n)=Tp1 when the maximal correlation value is detected.

In this case, instead of clearing the FIFO type shift register 124 after the maximal timing is detected, another FIFO type shift register (not shown) may be used to be used for detecting the minimal timing in the backward direction up to the minimal timing T(p1−4r), in the case of FIG. 2B.

Now, the operation of the second embodiment will be explained by referring to FIGS. 6 and 7.

Figure 6:
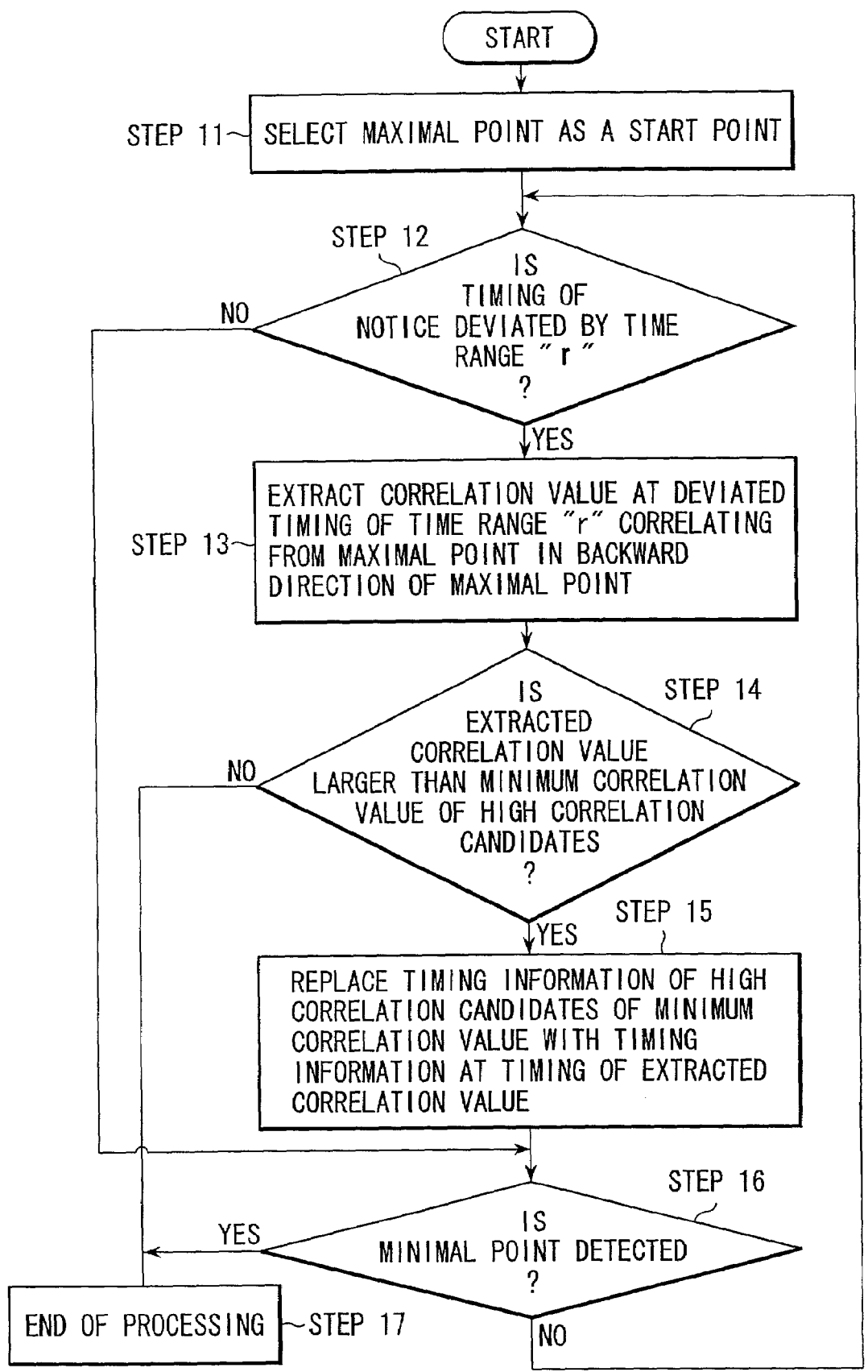
FIG. 6 is a flowchart showing the procedure of retrieval from the maximal point of the correlation value to a minimal point in the backward direction in the code synchronous timing determining circuit shown in FIG. 3.
Figure 7:
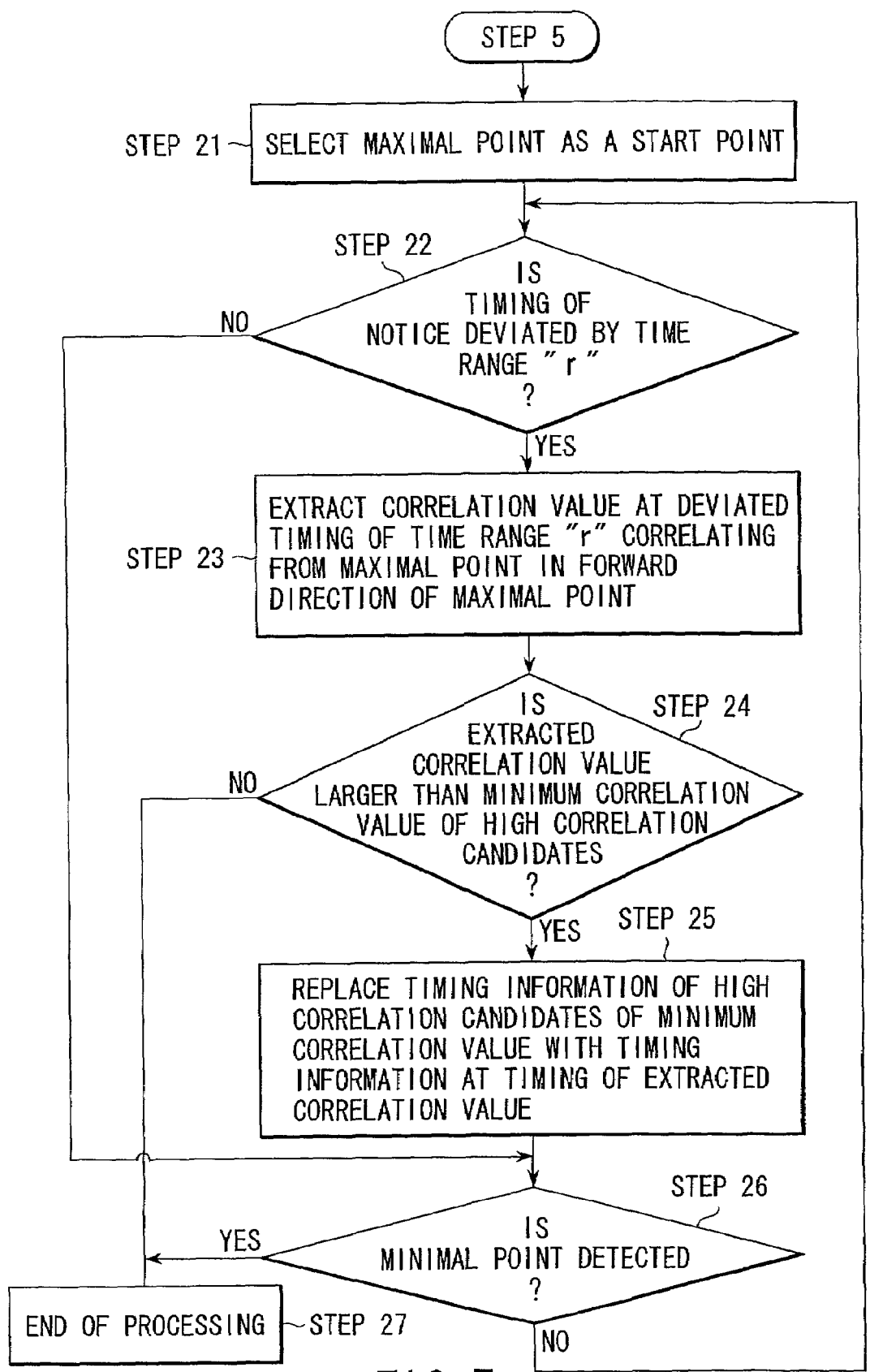
FIG. 7 is a flowchart showing the procedure of retrieval from the maximal point of the correlation value to a minimal point in the forward direction in the code synchronous timing determining circuit shown in FIG. 3.

FIG. 6 is a flowchart showing the procedure of extraction and scanning, starting from the maximal timing established in the flowchart in FIG. 5, up to the minimal timing in the backward direction of the maximal timing. FIG. 7 is a flowchart showing the procedure of extraction and scanning, starting from the maximal timing established in the flowchart in FIG. 5, up to the minimal timing in the forward direction of the maximal point.

First, as shown in the flowchart in FIG. 6, the maximal timing, for example, T(n)=tp1 established at step 5 in the flowchart in FIG. 5 is selected as start timing of extraction and scanning (step 11) using the correlation value held in the stage 204 in the FIFO type shift register 124.

When the maximal point is selected in the step 11, a step 12 is executed so as to detect whether the timing of notice is deviated by the dead time range "r" or not. If YES in step 12, the process goes to step 13. If NO, the process is shifted to step 16.

If YES is obtained in step 12, the process goes to the step 13 in which the correlation value data held in the timing of notice stage 204 is Tpk, for example. In this condition, a correlation value data separated from the maximal point T(n)=Tp1 is held in a stage of the FIFO shift register 124 shifted in the backward direction of the maximal point T(n)=Tp1 within the time width "r" are extracted. As mentioned above, in the correlation curve in FIG. 2B, the timing indicated by X-mark is within the time range effected by the code signal corresponding to the maximal point T(n)=Tp1, and hence the timing indicated by X-mark should be ignored and is not extracted.

On the other hand, the timing indicated by O-mark is at the time point separated from the peak P1 by the time width "r" which is determined at the maximal point T(n)=Tp1 at high probability, and hence the timing indicated by O-mark is extracted.

At step 13, the correlation value held in the timing of notice stage 204 is detected at timing T(p1−r) before the time "r" from the maximal point Tp1.

Then, the correlation value in the stage 204 at the timing T(p1−r) is compared with the correlation values held in the register 123 and judged if larger than the minimal correlation value of correlation values of high correlation value candidates at plural, for example, 16 other timings registered preliminarily (step 14).

When the correlation value at the timing T(p1−r) is smaller than the smallest correlation value of high correlation value candidates registered in the register 123, the process is terminated (step 17).

On the other hand, when the correlation value at the timing T(p1−r) is larger than the smallest correlation value of high correlation value candidates, the timing information of the minimal correlation value of high correlation value candidates is replaced with the timing information of the correlation value at the timing T(p1−r) held in the timing of notice stage 204 (step 15). Instead of replacing, the timing information of the correlation value at the timing T(p1−r) may be adopted at high correlation candidate.

Next, the timing T(p1−r) is judged to be minimal point or not (step 16). If the timing T(p1−r) is minimal point, the process is terminated (step 17).

On the other hand, the timing T(p1−r) is not minimal point, the process returns to step 12. That is, at step 12, this time, the data shift is performed in the FIFO shift register 124 until the correlation value at timing T(p1−2r) before a time point 2r from the maximal point T(n)=Tp1 is read out and held in the timing of notice stage 204, and the same procedure as at the timing T(p1−r) is executed up to step 16.

Thus, after completion of process in the backward direction of the maximal point starting from the maximal point of the correlation value curve C1, a process in the forward direction is started with respect to the correlation curve C1. When the backward and forward operations are terminated, maximal points of the other correlation value curves C2 to C6 are similarly processed. When the process in the backward direction of the maximal point is completed in all maximal points, the register 123 holds the correlation value and identifier of timing information of high correlation, about all high correlation value candidates in the backward direction of the maximal point.

Next, same as in the process in the backward direction of the maximal point, the process is executed in the forward direction. In this process in the forward direction, the temporarily stopped FIFO register 124 is restarted and the following correlation value data is read out and transferred from the RAM 12. First, as shown in the flowchart in FIG. 7, the maximal point, for example, T(n)=Tp1 established at step 5 in the flowchart in FIG. 5 is selected as start point of extraction and scanning (step 21).

When the maximal point is selected in the step 21, a step 22 is executed so as to detect whether the timing of notice is deviated by the dead time range "r" or not. If YES in step 22, the process goes to step 23. If NO, the process is shifted to step 26.

If YES is obtained in step 22, the process goes to the step 23 in which the correlation value data held in the timing of notice stage 204 is Tp1, for example. In this condition, a correlation value data separated from the maximal point T(n)=Tp1 is held in a stage of the FIFO shift register 124 shifted in the forward direction of the maximal point T(n)=Tp1 within the time width "r" are extracted. As mentioned above, in the correlation curve in FIG. 2B, the timing indicated by X-mark is within the time range effected by the code signal corresponding to the maximal point T(n)=Tp1, and hence the timing indicated by X-mark should be ignored and is not extracted.

On the other hand, the timing indicated by O-mark is at the time point separated from the peak P1 by the time width "r" which is determined at the maximal point T(n)=Tp1 at high probability, and hence the timing indicated by O-mark is extracted.

From the maximal point T(n)=Tp1, correlation values in the forward direction of the maximal point T(n)=Tp1 are extracted in time series at intervals of the time "r" (step 23). At step 23, the correlation value is detected at the timing T(n+r) after the time "r" from the maximal timing T(n)=Tp1.

The correlation value at the timing T(p1+r) is judged if larger than the minimal correlation value of correlation values of high correlation value candidates at plural, for example, 16 other timings registered preliminarily (step 24). When the correlation value at the timing T(p1+r) is smaller than the minimal correlation value of high correlation value candidates, the process is terminated (step 27).

On the other hand, when the correlation value at the timing T(p1+r) is larger than the minimal correlation value of high correlation value candidates, the timing information of the minimal correlation value of high correlation value candidates is replaced with the timing information of the correlation value at the timing T(p1+r) (step 25).

Instead, the timing information of the correlation value at the timing T(p1+r) may be adopted at high correlation value candidate. Next, the timing T(p1+r) is judged to be minimal point or not (step 26). If the timing T(p1+r) is minimal point, the process is terminated (step 27). On the other hand, the timing T(p1+r) is not minimal point, the process returns to step 22. That is, at step 22, this time, extracting the correlation value at timing T(p1+2r) after time 2r from the maximal point T(n)=Tp1, the same procedure as at the timing T(p1+r) is executed up to step 26.

Thus, in the process in the forward direction of the maximal point starting from each maximal point, when the process in the forward direction of the maximal point is completed in all maximal points, all high correlation value candidates in the forward direction of the maximal point will hold the correlation value and identifier of timing information of high correlation.

As described herein, according to the embodiment, first the maximal point is detected, then the detected maximal point is selected as start point, and from the maximal point T(n)=Tp1, timings of high correlation are scanned in the time range until the minimal point is detected in the backward direction of the maximal point T(n), and further from the maximal point T(n), timings of high correlation are scanned in the time range until the minimal point is detected in the forward direction of the maximal point T(n)=Tp1, so that timings of high correlation can be established without scanning the entire range of the RAM 12 every time as required in the prior art. Moreover, the number of times of scanning of all timing candidates can be suppressed, and therefore the code synchronism of code division multiplex communication can be established at high speed.

The process in the backward direction of the maximal point T(n)=Tp1 and process in the forward direction of the maximal point T(n)=Tp1 are not required to be done sequentially but may be done parallel. When minimal points are detected continuously, registration of second and subsequent minimal points may be overwritten.

As a result, on the basis of the correlation value curve data issued from the matched filter MF shown in FIG. 2A, code synchronous timing candidates from candidate timings t1 to t6 as shown in FIG. 8A and the corresponding correlation values can be held in the code synchronous timing determining device 13. The data representing the candidate timings t1 to t6 are supplied in the control device 14.

The control device 14 issues a control signal for controlling the synchronism of multiple-path signals depending on the timing data output from the code synchronous timing determining device 13. The control signal is entered in the correlators COR1 to CORn. Reception signals supplied in the matched filter MF are simultaneously supplied in the correlators COR1 to CORn.

For example, supposing the data of the curve C1 from the first path received earliest in the multiple paths to be synchronized at timing t1, as shown in FIG. 8B, the beginning position of the code series of this signal curve C1 is regarded to correspond to the timing t1. Therefore, when a control signal is supplied from the control device 14 to the first correlator COR1 in synchronism with the timing t1, the correlator COR1 correlates in synchronism with the beginning position of the code series of the signal received through the first path, and the reception signal of the first path de-spread in the code series is given to the RAKE combing device 15 through the first finger circuit.

Similarly, supposing the curve signal C2 from the second path to be synchronized at timing t2, as shown in FIG. 8B, the beginning position of the code series of this curve signal C2 is regarded to correspond to the timing t2. Therefore, when a control signal is supplied from the control device 14 to the second correlator COR2 in synchronism with the timing t2, the correlator COR2 correlates in synchronism with the beginning position of the code series of the signal received through the second path, and the reception signal of the second path de-spread in the code series is given to the RAKE combing device 15 through the second finger circuit.

In the same manner, when code synchronous timing candidates of t1 to tn are determined for n pieces of multiple paths in the code synchronous timing determining device 13, control signals corresponding to these timings are supplied from the control device 14 into the correlators COR1 to CORn in FIG. 1, and correlated in synchronism with the beginning position of code series of signals received at different timings through individual paths, and reception signals de-spread in the code series are supplied to the RAKE combining device 15.

Thus, the correlation values synchronized at timings corresponding to the individual paths are obtained in synchronism with the beginning position of code series, and therefore, by using RAMS as temporal storage for each finger circuit for the RAKE combining device 15, for example, the mutual time difference from timings t1 to t6 may be adjusted to be zero, and as shown in FIG. 8C, the outputs of all fingers may be combined in a synchronous state, so that a reception output of clear and high precision may be obtained.

In the embodiment of the invention, the scanning range of correlation value curve for determining the code synchronous timing is divided each in a short time before and after maximal change point of correlation value, and the load of comparison of correlation values may be alleviated by eliminating effects of correlation values having a same correlation with the correlation value of maximal change point in the division, so that the timing of high correlation may be easily determined, and therefore the number of times of scanning can be suppressed, and the code synchronism in code division multiplex access and reception can be realized at high speed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A code synchronous timing determining method comprising:
   acquiring correlation values of a code included in a CDMA reception signal and an internal code prepared in a receiving station at plural timings in each of a plural given time widths included in a given period;
   storing the correlation values corresponding to the plural timings;
   retrieving a maximal correlation value from the stored correlation values to register a retrieved timing corresponding to the maximal correlation value as a maximal timing;
   scanning the stored correlation values in a given direction to detect at least one minimal correlation value to register a retrieved minimal timing corresponding to the detected minimal correlation value;
   extracting at least one correlation value selected from the correlation values stored at plural timings having a specified time interval from the maximal timing to the minimal timing as a high correlation value candidate; and
   holding timing data corresponding to the high correlation value candidate as timing information of code synchronism.

2. The code synchronous timing determining method according to claim 1, wherein the retrieving of the maximal timing is performed by:
   comparing the correlation value at the timing of notice with a predetermined value,
   detecting whether or not the correlation value has a maximal value when the correlation value is judged to be larger than the predetermined value, and
   registering the timing of notice as the maximal timing when judged to have a maximal value.

3. The code synchronous timing determining method according to claim 2, further comprising:
   setting a retrieval time width for detecting a maximum timing at the timing of notice defined in each of said given time widths; and
   determining the maximum timing as the maximal timing within the set retrieval time width.

4. The code synchronous timing determining method according to claim 2, further comprising:
    terminating the process relating to the correlation value at a timing of notice, when the correlation value at the timing of notice is smaller than the predetermined value as a result of comparison between the correlation value and the predetermined value.

5. The code synchronous timing determining method according to claim 2, further comprising:
    determining, as the predetermined value, a minimum correlation value of the high correlation timing candidates preset for timing determination of code synchronism.

6. The code synchronous timing determining method according to claim 2, further comprising: determining, as the predetermined value, a specified threshold value.

7. The code synchronous timing determining method according to claim 6, further comprising:
    determining, as a specified threshold value, a threshold value corresponding to a noise.

8. The code synchronous timing determining method according to claim 3, further comprising:
    extracting the correlation value by comparison between the stored correlation value and predetermined value.

9. The code synchronous timing determining method according to claim 8, further comprising:
    holding the timing information of the stored correlation value by replacing the same with the timing information of the held high correlation candidate, when the stored correlation value is determined as being larger than the predetermined value as a result of comparison.

10. The code synchronous timing determining method according to claim 8, further comprising:
    terminating the process relating to the stored correlation value when the stored correlation value is determined as being larger than the predetermined value as a result of comparison.

11. The code synchronous timing determining method according to claim 8, further comprising:
    determining, as the predetermined value, the minimum correlation value of the high correlation candidates extracted from outside range of the retrieval time width.

12. The code synchronous timing determining method according to claim 8, further comprising:
    determining, as the predetermined value, a specified threshold value.

13. The code synchronous timing determining method according to claim 8, further comprising:
    determining, as the specified threshold value, a threshold value corresponding to a noise.

14. The code synchronous timing determining method according to claim 1, further comprising:
    terminating a process with respect to correlation values relating to the maximal timing, when the minimal timing is registered.

15. A code synchronous timing determining method comprising:
    acquiring plural correlation values showing correlation between a code assigned in a specified channel and a code included in a CDMA reception signal together with the time data showing the timing of obtaining the correlation values;
    storing the acquired plural correlation values in association with the corresponding time data;
    detecting, at a timing of notice, a timing having a largest correlation value in the stored plural correlation values within a predetermined time width;
    registering the largest timing detected at the timing of notice as the maximal timing; comparing each correlation value stored in the forward and backward directions from the maximal timing with a predetermined value;
    registering a timing when the associated correlation value is detected to be less than a minimum correlation value as the minimal timing;
    extracting at least one high correlation value from the correlation values obtained in the every specified time interval from the maximal timing till the minimal timing; and
    registering a timing data corresponding to the extracted high correlation value as candidate timing data for code synchronism.

16. The code synchronous timing determining method according to claim 15, further comprising:
    stopping the registering of a new maximal timing, once the maximal timing is registered, and until the minimal timing is registered.

17. A code synchronous timing determining apparatus comprising:
    a correlator configured to acquire correlation values of a code included in a received CDMA signal and an internal code provided in the apparatus at plural timings in each of a plural given time widths included in a given period;
    a storage circuit configured to store the correlation values corresponding to the plural timings;
    a first registering unit configured to retrieve at least one timing having a maximal value among stored plural correlation values and to register the one timing as a maximal timing;
    a second registering unit configured to scan each correlation value in the forward and backward directions from the maximal timing to detect a minimal correlation value and to register a timing corresponding to the minimal correlation value as a minimal timing;
    an extractor configured to extract at least one correlation value having a value of a predetermined value or more from the correlation values stored at plural timings having a specified timing interval from the maximal timing to the minimal timing, as a high correlation value candidate; and
    a holding unit configured to hold a timing corresponding to the high correlation value candidate as timing information of code synchronism.

18. The code synchronous timing determining apparatus according to claim 17, wherein the first registering unit includes a comparing circuit configured to compare whether or not the correlation value at a timing of notice is larger than a predetermined value, a detecting circuit configured to detect whether or not the correlation value has a maximal value when the correlation value is judged to be larger than the predetermined value, and a registering circuit configured to register the timing of notice as the maximal timing when judged to have a maximal value.

19. The code synchronous timing determining apparatus according to claim 18, further comprising a setting circuit configured to set a retrieval time width in a predetermined width before and after the timing of notice for retrieving the maximal timing, wherein the maximal timing is retrieved within the set retrieval time width.

20. The code synchronous timing determining apparatus according to claim 18, further comprising a control circuit configured to terminate a process relating to the correlation value at the timing of notice when the correlation value at the timing of notice is smaller than the predetermined value as a result of comparison between the correlation value and the predetermined value.

21. The code synchronous timing determining apparatus according to claim 18, wherein the predetermined value is a minimal correlation value of the high correlation timing candidates preset for timing determination of code synchronism.

22. The code synchronous timing determining apparatus according to claim 18, wherein the predetermined value is a specified threshold value.

23. The code synchronous timing determining apparatus according to claim 22, wherein a specified threshold value is a threshold value corresponding to a noise.

24. The code synchronous timing determining apparatus according to claim 19, wherein the high correlation value candidate is extracted by comparison between a registered high correlation value candidate and a correlation value detected as a new candidate by the comparing circuit.

25. The code synchronous timing determining apparatus according to claim 19, further comprising a control unit to replace first timing information of the stored correlation value with second timing information of the held high correlation candidate and holding first the timing information when the stored correlation value is larger than the predetermined value as a result of comparison by the comparing circuit.

26. The code synchronous timing determining apparatus according to claim 25, further said control unit further comprising a termination unit configured to terminate a process relating to the stored correlation value when the stored correlation value is smaller than the predetermined value as a result of comparison by the comparing circuit.

27. The code synchronous timing determining apparatus according to claim 19, wherein the predetermined value is the minimal correlation value of the high correlation candidates extracted from outside range of the retrieval time width.

28. The code synchronous timing determining apparatus according to claim 19, wherein the predetermined value is a specified threshold value.

29. The code synchronous timing determining apparatus according to claim 28, wherein a specified threshold value is a threshold value corresponding to a noise.

30. The code synchronous timing determining apparatus according to claim 19, wherein the control unit includes an inhibit unit configured not to register a new maximal timing, once the maximal timing is registered, until the minimal timing is registered.

31. A CDMA receiving apparatus comprising:
a receiver configured to receive a CDMA signal;
a first correlator configured to generate code correlation values corresponding to a specified code from an output of the receiver;
a storage device configured to store the correlation values;
a code synchronous timing determining device configured to determine plural code synchronous timing candidates by reading the correlation values stored in the storage device, the code synchronous timing determining device including a time width designating unit configured to designate a limit number of correlation values data of the correlation values stored in said storage device, and candidate extracting unit configured to extract high correlation values as code synchronous timing candidates from the limit number of correlation values designated by said time width designating unit;
a control device configured to issue a control signal for controlling code synchronism with the CDMA signal received by using the code synchronous timing candidates obtained from the code synchronous timing determining device;
plural second correlators configured to issue correlation values at plural timings by the code synchronous timing candidates; and
a combining device configured to sum up the correlation values from the plural second correlators.

32. A code synchronous timing determining apparatus comprising:
a correlator configured to acquire correlation values of a code included in a CDMA reception signal and an internal code provided in the apparatus at plural timings in each of a plural given time widths included in a given period;
a storage circuit configured to store the correlation values corresponding to the plural timings;
a scanning element to scan the stored correlation values; and
a high correlation candidate holding element configured to hold an identifier and a correlation value at the timing of detection of a higher correlation value of a predetermined value or more by scanning by the scanning element,
wherein said scanning element includes:
a holding circuit having a number of data holding stages configured to hold timing information at the plural timings in a time sequence order acquired in relation to the correlation values, the number of the data holding stages being defined to correspond to a limit number of correlation values data of the correlation values stored in said storage circuit;
a registering circuit configured to retrieve a timing corresponding to a correlation value having at least one maximal value from the information at the plural timings held in the holding circuit, to register the timing as maximal timing; and
candidate extracting unit configured to extract high correlation values as code synchronous timing candidates from the limit number of correlation values held in said holding circuit.

* * * * *